United States Patent [19]

Negi

[11] Patent Number: 4,710,925
[45] Date of Patent: Dec. 1, 1987

[54] DATA COMMUNICATION SYSTEM
[75] Inventor: Tsuneo Negi, Tokyo, Japan
[73] Assignee: Canon Kabushiki Kaisha, Tokyo, Japan
[21] Appl. No.: 679,558
[22] Filed: Dec. 7, 1984
[30] Foreign Application Priority Data Dec. 12, 1983 [JP] Japan .................................. 58-232870

[51] Int. Cl.⁴ ............................................ G06F 11/00
[52] U.S. Cl. .......................................... 371/5; 371/22
[58] Field of Search ................. 371/5, 22, 67; 375/34, 375/58; 455/63

[56] References Cited
U.S. PATENT DOCUMENTS 3,988,677 10/1976 Fletcher ............................ 371/45 X
4,110,558 8/1978 Kageyama ......................... 371/5 X
4,234,953 11/1980 Kline ..................................... 371/5
4,309,771 1/1982 Wilkens ............................. 371/5 X
4,339,657 7/1982 Larson ............................... 371/5 X
4,367,550 1/1983 Douverne ............................. 371/5

FOREIGN PATENT DOCUMENTS 39191 11/1981 European Pat. Off. ................ 371/5

Primary Examiner—Jerry Smith
Assistant Examiner—Robert W. Beausoliel, Jr.
Attorney, Agent, or Firm—Fitzpatrick, Cella, Harper & Scinto

[57] ABSTRACT

A test signal is received for testing the transmission rate, the number of errors in the test signal in a predetermined time period is detected, and the number of errors is compared with a predetermined number to determine the proper transmission rate for data communication.

8 Claims, 9 Drawing Figures

DATA COMMUNICATION SYSTEM

BACKGROUND OF THE INVENTION

1. Field of the Invention

The present invention relates to a data communication system for communicating data such as a image data or a character data.

2. Brief Description of the Prior Art

In a prior art data communication system such as a G3 facsimile machine which meets the CCITT Recommendation, in a so-called fall-back mode a plurality of transmission rates are tested in a descending rate order in accordance with the status of transmission line in a pretransmission step to determine an appropriate transmission line to be used.

In this test or training, a training signal for converging an auto-equalizer of a modem in a receiver and a TCF (training check) signal are transmitted in a pair. The TCF signal is a modulation signal which has a data value "0" for 1.5±0.15 seconds. In the prior art system, the training is checked by checking that there is no data error for at least a predetermined period (e.g. 1 second) after the receipt of the TCF signal or the number of data errors in an entire training check period is smaller than a predetermined number.

However, since the equalizer of the modem in the receiver converges with the time, there is a high possibility that a training failure may be detected even if the equalizer converges in the latter half period of the TCF signal and fall-back to a lower transmission rate takes place.

SUMMARY OF THE INVENTION

It is an object of the present invention to provide a data communication system which prevents undesired fall-back to a low transmission rate and can communicate at a higher transmission rate.

The other objects and features of the present invention will be apparent from the following description of the invention taken in conjunction with the accompanying drawings.

DETAILED DESCRIPTION OF THE PREFERRED EMBODIMENTS

In the following description, a G3 facsimile machine which meets the CCITT Recommendation is explained, and for those signals which are known in the CCITT Recommendation, only the names of those signals are described and the explanation thereof is omitted.

Figure 1:
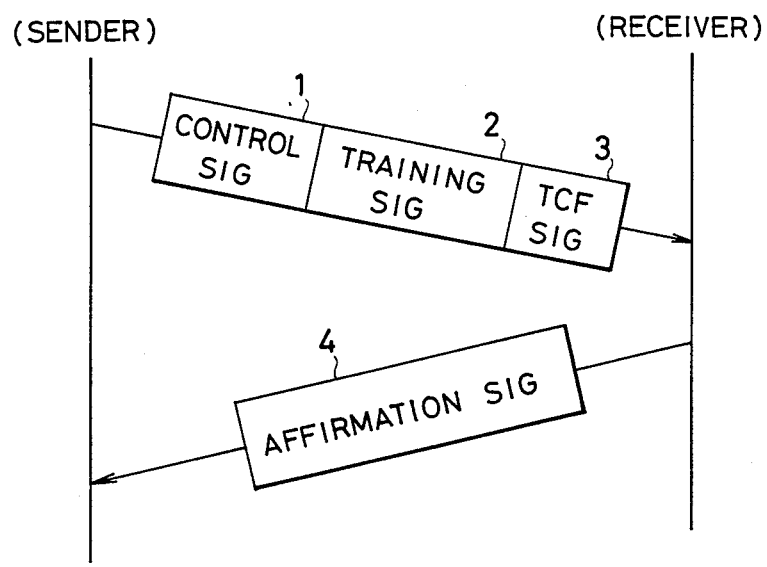
FIGS. 1 and 2 illustrate communication according to one embodiment of the present invention.
Figure 2:
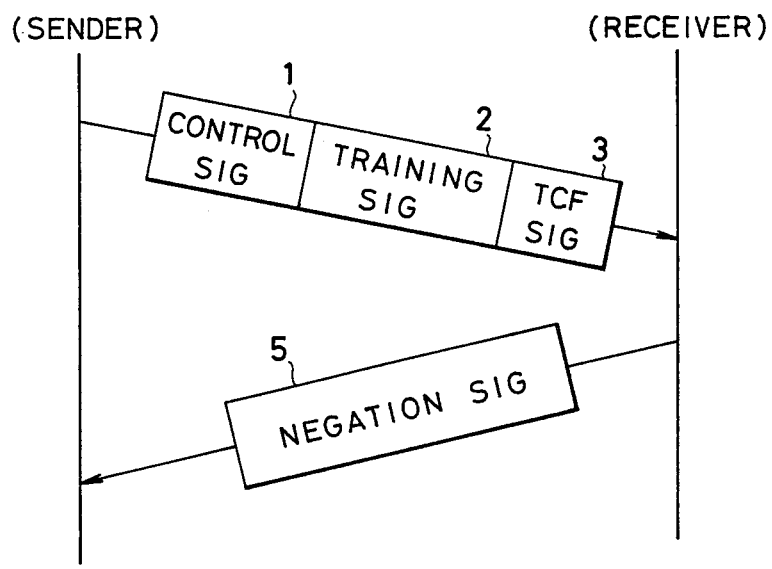

FIGS. 1 and 2 show a manner of training in the present invention. FIG. 1 shows training success and FIG. 2 shows training failure.

In those figures, numeral 1 denotes a control signal which is a DCS (digital command) signal in the G3 mode. As is known, a FIF (facsimile information field) of the DCS signal contains transmission rate information and available fall-back mode information pertaining to the sender.

A training signal 2 serves to converge an equalizer and is followed by a TCF signal 3 which is continuation of "0". The DCS signal 1, training signal 2 and TCF signal 3 are sent from the sender to the receiver.

If the training for those signals is successful, an affirmation signal is sent as shown in FIG. 1. In the G3 mode, this signal is a CFR (confirmation for reception) signal. If the receiver fails the training, a negating signal 5 is sent as shown in FIG. 2. This signal is a FTT (failure to train signal.

Figure 3:
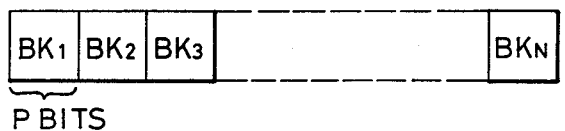
FIG. 3 illustrates division of a TCF signal in FIGS. 1 and 2.

In the present embodiment, the TCF signal 3 is divided into N blocks $BK_1$-$BK_n$ as shown in FIG. 3 and a data error in each block is checked to check the training. The number of bits in each block is P although it may be appropriately determined according to the needs of a particular case.

As described above, the TCF signal 3 is the continuation of "0". Where the equalizer of the modem in the receiver cannot converge depending on the status of a transmission line, "0" may not be identified from a demodulated signal. Data error rates in the blocks $BK_1$-$BK_n$ are represented by $ER_1/P$, $ER_2/P$, ..., $ER_n/P$ where P is the number of bits in each of the blocks $BK_1$-$BK_n$ and $ER_1$, $ER_2$, ..., $ER_n$ are the numbers of errors, or non-"0" data, in the blocks $BK_1$-$BK_n$, respectively.

Figure 4:
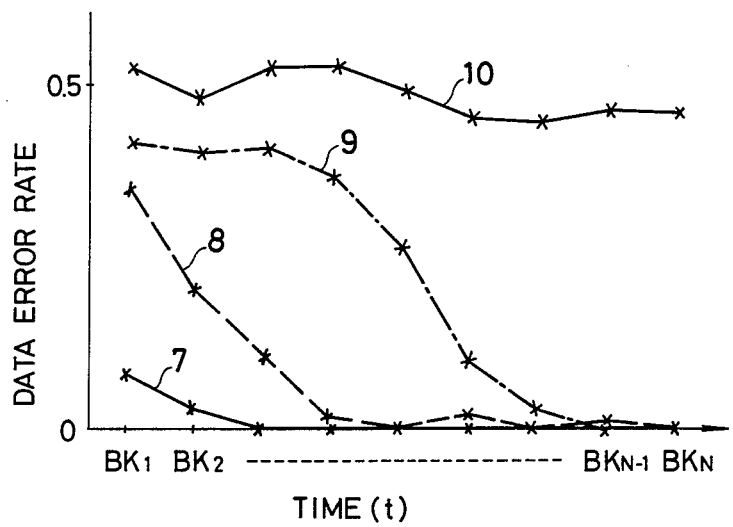
FIG. 4 shows error generation patterns in a TCF signal period.

It is considered that the errors are generated in patterns shown in FIG. 4 in the TCF signal period. In FIG. 4, the error rates $ER_1/P$, $ER_2/P$, ..., $ER_n/P$ are plotted in accordance with possible patterns.

In a pattern 10 of FIG. 4, the error rate is larger than 0.5 over the entire period of the TCF signal and it shows that the equalizer does not converge.

In a pattern 7, the equalizer converges in the first half of the TCF signal period. In patterns 8 and 9, the equalizer converges in the latter half of the TCF signal. In the patterns 7-9, a satisfactory result will be obtained even if an image signal is transmitted under those conditions. In the prior art system, however, the training failure is detected because the number of errors in the entire TCF period is checked, and the fall-back to a low transmission rate takes place.

Figure 5:
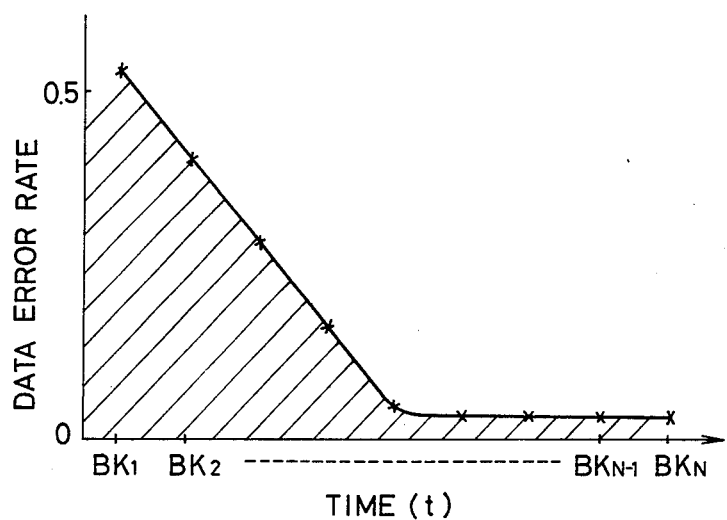
FIG. 5 shows a criterion of an error rate in the first preferred embodiment of the present invention.

In the present embodiment, as shown in FIG. 5, a criterion of the error rate is determined for each block, and if the error rate is below the criterion, the training success is detected and the CFR signal is sent back.

In accordance with the present system, the undesired fall-back to the low transmission rate is avoided even in the case of patterns 8 and 9 of FIG. 4 so that the transmission rate is increased, the process time is reduced, and the overall communication time is reduced.

A specific arrangement for the above operation is now described.

Figure 6:
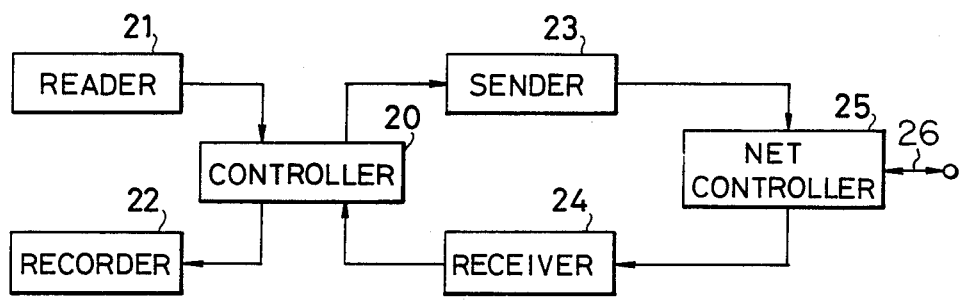
FIG. 6 is a block diagram of a facsimile machine in accordance with the present invention.

FIG. 6 is a block diagram of a transmission/reception facsimile machine, numeral 21 denotes an image reader which employs a CCD sensor, and numeral 22 denotes a recorder which may be a thermal printer.

Data to be read or recorded by the reader 21 or the recorder 22 is processed by a control unit 20 which may be a microcomputer. The image data read is encoded by the control unit 20 and modulated by a transmitter 23 (labelled "sender") and sent out to a transmission line such as a telephone line 26 through a network control unit 25. The data transmitted through the transmission line is supplied to a receiver 24 through the network control unit 25 and demodulated by the receiver 24, and the decoded signal is recorded by the recorder 22.

A pre-transmission procedure and a post transmission procedure are carried out by the control unit 20 through the transmitter 23 and the receiver 24. The transmitter 23 and the receiver 24 usually include modems, and the receiver 24 includes the auto-equalizer.

Figure 7:
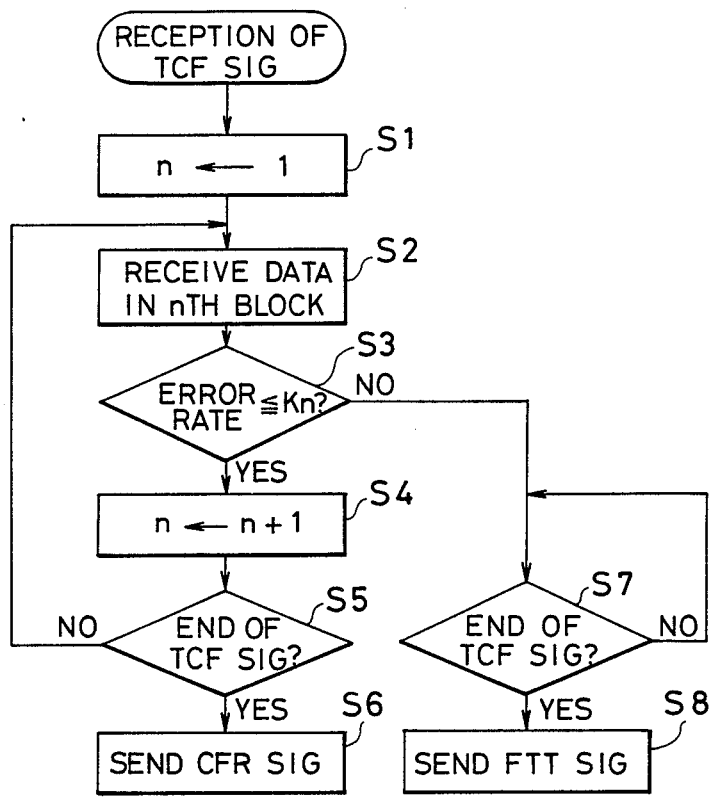
FIG. 7 is a flow chart of a control sequence of a control unit of FIG. 6.

The calculation of the error rate in the reception of the TCF signal and the discrimination of success or failure of the training are effected in accordance with steps shown in the flow chart of FIG. 7.

When the control unit 20 detects the TCF signal transmitted through the network control unit 25 and the receiver 24, it brings about the steps shown in FIG. 7. In a step S1, "1" is loaded to a software counter in a memory of the control unit 20 or a hardware counter. The counter counts the blocks $BK_1$-$BK_n$ of the TCF signal 3.

In a step S2, the control unit reads the data of the n-th received block into a predetermined area of the memory, counts the number of errors $ER_n$ in that block, that is, the number of non-"0" data, and calculates the error rate $ER_n/P$ of that block by dividing $ER_n$ by the number of bits P in the block.

In a step S3, the error rate $ER_n/P$ is compared with a maximum allowable error rate $K_n$ of that block, and if $ER_n/P \leq K_n$, the process proceeds to a step S4, while if $ER_n/P > K_n$, the process proceeds to a step S7. In this decision step, maximum allowable error rates for the respective blocks are previously stored in the memory in the form of a table, and the appropriate value in the table is looked up by the count of the block counter to determine Kn.

In the step S4, the block counter is incremented by one, and in a step S5, whether the TCF signal has terminated or not is determined. If the TCF signal has not terminated, the process returns to the step S2 and the next block to the TCF signal is checked. If the TCF signal has terminated, the process proceeds to a step S6 where the affirmation signal 4 or the CFR signal is sent out as shown in FIG. 1.

If the error rate is larger than the maximum allowable error rate in the step S3, the termination of the TCF signal is detected in the step S7 and the negation signal 5 indicating the training failure, that is, the FTT signal is sent out in a step S8 as shown in FIG. 2.

In this manner, the TCF signal is divided into blocks and the error rates for the respective blocks are checked so that the determination of the training failure is prevented if the equalizer of the receiver 24 converges in the TCF signal period, the undesired fall-back is avoided, the process time is reduced, the communication time is reduced and the running cost is reduced. Since the present embodiment can be implemented by a modification of a small amount of software, the implementation is very simple and inexpensive.

While the G3 facsimile machine has been particularly described, it should be understood that the present invention is applicable to other communication systems which carry out similar training. While the TCF signal is divided into n P-bit blocks in the present embodiment, it is not necessary to divide the TCF signal into blocks of equal number of bits; it may be divided into blocks of unequal numbers of bits. While the error rate is calculated for each block in the flow chart of FIG. 7, the error rate need not be calculated for each block if the blocks have equal number of bits but the success/failure of the training may be determined by the number of errors.

While the criteria of the error rates shown in FIG. 5 are determined by a linear function, they may be determined by criteria defined by a curve which is considered appropriate by those skilled in the art.

In accordance with the first embodiment, in the data communication system which tests the transmission rate in accordance with the number of errors in the received signal, the received signal is divided into the blocks and the transmission rate for each block is tested in accordance with the number of errors in each block. Accordingly, the undesired fall-back to the low transmission rate is avoided by the simple and inexpensive arrangement, the process time is reduced, the communication time is reduced and the running cost is reduced.

Figure 8:
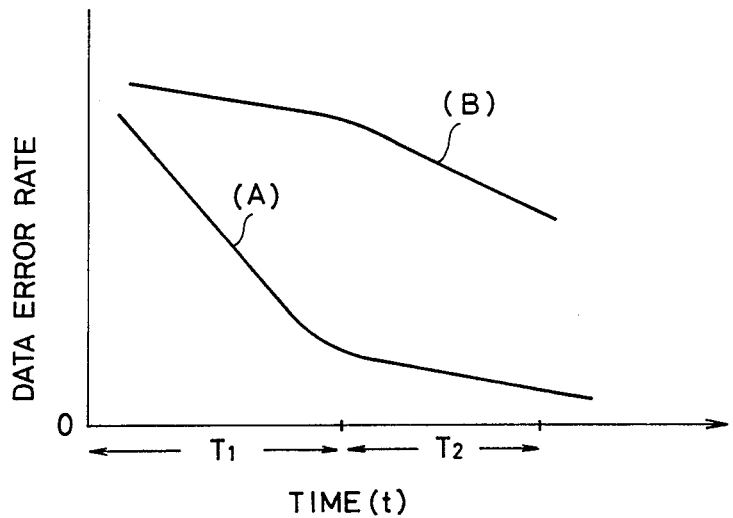
FIG. 8 shows a second preferred embodiment of the invention.
Figure 9:
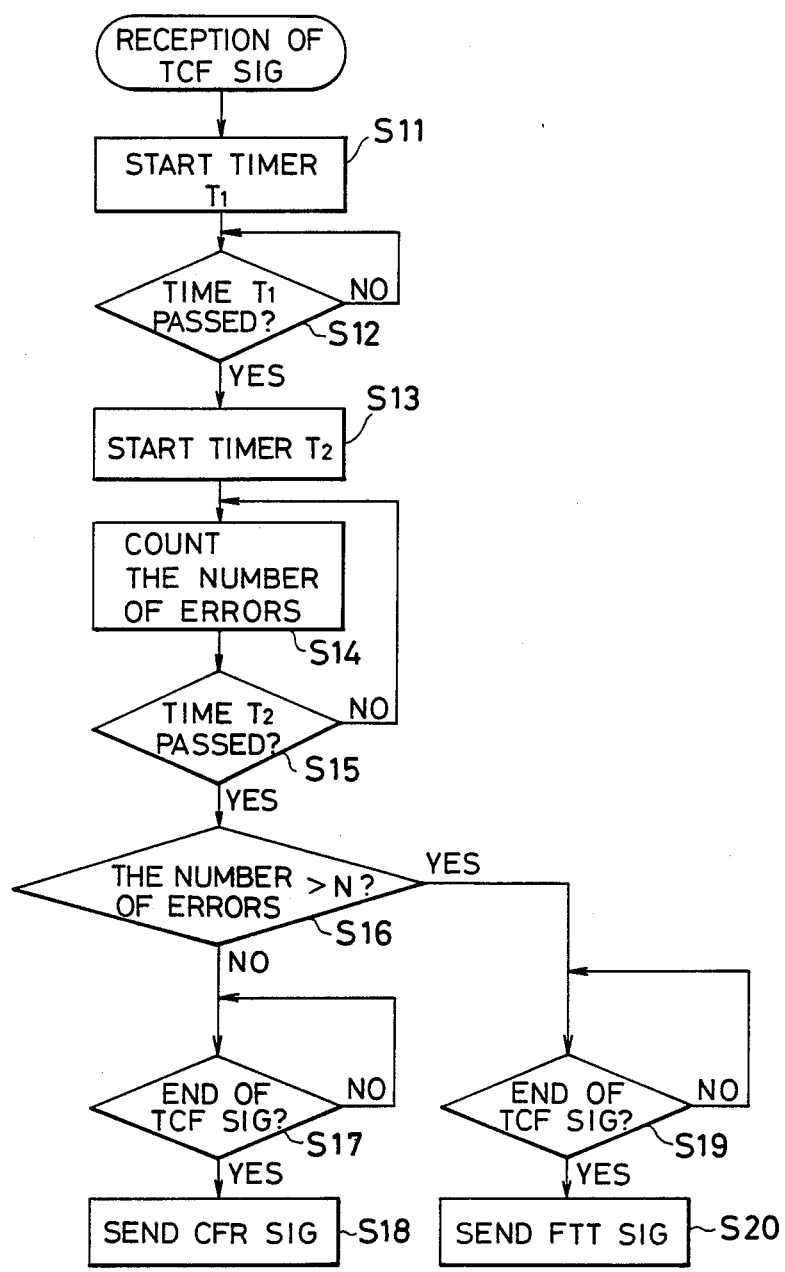
FIG. 9 is a flow chart of a control sequence of the second embodiment.

Referring to FIGS. 8 and 9, another embodiment of the present invention is explained. In the present embodiment, the convergence of the equalizer of the receiver modem with time after the transmission of the TCF signal is utilized, and the number of errors in a predetermined time period T2 after a predetermined time period T1 is checked to determined if the reception status is normal or not.

As shown by a curve (A) in FIG. 8, if the error rate is high in the time period T1 and low in the time period T2, the reception status is determined to be normal. As shown by a curve (B) in FIG. 8, if the error rates are high in both the time periods T1 and T2, the FTT signal is sent out and the fall-back mode is started.

A control flow chart of the second embodiment is shown in FIG. 9.

(S11-S12)

When the TCF signal is received, a timer T1 is started to count the time T1. The control circuit may be that shown in FIG. 6.

(S13-S15)

After the time T1, a timer T2 is started and the number of errors generated in the time T2 is counted.

(S16-S18)

If the number of errors in the time T2 is no larger than a predetermined number N, the affirmation signal or the CFR signal is sent to the transmitter after the end of the reception of the TCF signal.

(S19, S20)

If the number of errors is larger than N in the step S16, the negating signal or the FTT signal is sent to the transmitter after the end of the reception of the TCF signal. As a result, the transmitter assumes the low transmission rate fall-back mode.

As described above, in the second embodiment, the training failure is not detected when the equalizer converges, so that the undesired fall-back is avoided, the process time is reduced and the data communication time is reduced. Accordingly, the total communication time is reduced.

The present invention is not limited to the illustrated embodiments and many modifications may be made within the scope of the appended claims.

What I claim is:

1. A data communication method comprising the steps of:
    receiving a test signal for testing a transmission rate;
    dividing a reception period of the test signal into a plurality of periods and detecting an error for each of the periods;
    discriminating a failure of the reception of the test signal for each of the periods in accordance with a criterion which is set to become increasely difficult with the lapse of time; and
    transmitting a signal representing the failure of the test signal reception to a test signal transmission party, in response to discrimination of the failure of the test signal reception in said discriminating step.

2. A method according to claim 1, wherein, in said detecting step, the number of errors in each of the periods is detected, and in said discriminating step, the number of errors in each of the periods is compared with a predetermined number.

3. A data communication method according to claim 2, wherein said predetermined number varies for each discrimination.

4. A data communication method according to claim 3, wherein said predetermined number decreases with time.

5. A data communication method according to claim 1, wherein said data is image data.

6. A data communication method comprising the steps of:
    receiving a test signal for testing a transmission rate;
    detecting the number of errors occurring within a second predetermined period of time which commences after termination of a first predetermined period of time measured from a start of the reception of the test signal;
    comparing the number of errors with a predetermined number; and
    transmitting a signal representing the failure of the reception of the test signal to a party which transmitted the test signal, when the number of errors is larger than the predetermined number in said comparing step.

7. A data communication method according to claim 6, wherein said detecting step comprises detecting the number of errors once during the reception of the test signal.

8. A method according to claim 6, wherein the data includes image data.

* * * * *

UNITED STATES PATENT AND TRADEMARK OFFICE
CERTIFICATE OF CORRECTION

PATENT NO. : 4,710,925
DATED : December 1, 1987
INVENTOR(S) : TSUNEO NEGI

It is certified that error appears in the above-identified patent and that said Letters Patent is hereby corrected as shown below:

COLUMN 1

Line 7, "a" should be deleted.
   Line 8, "a" should be deleted.

COLUMN 2

Line 21, "train signal." should read --train) signal.--.

COLUMN 3

Line 42, "Kn." should read --$K_n$.--.

COLUMN 5

Line 13, "increasely" should read --increasingly--.

Signed and Sealed this

Third Day of May, 1988

Attest:

DONALD J. QUIGG

*Attesting Officer*   *Commissioner of Patents and Trademarks*